United States Patent [19]

Priefert

[11] 3,945,661
[45] Mar. 23, 1976

[54] TRAILER APPARATUS FOR LOADING AND TRANSPORTING A FARM UNIT

[76] Inventor: Marvin J. Priefert, Rte. No. 1, Mount Pleasant, Tex. 75455

[22] Filed: Jan. 2, 1975

[21] Appl. No.: 538,237

Related U.S. Application Data

[63] Continuation of Ser. No. 341,698, March 15, 1973, abandoned.

[52] U.S. Cl. ................................. 280/46; 214/373
[51] Int. Cl.² ......................................... B62B 1/08
[58] Field of Search .......... 280/46, 34 R, 34 B, 414, 280/47.24, 43.24, 30; 214/373, 374, 394, 376

[56] References Cited
UNITED STATES PATENTS

| | | | |
|---|---|---|---|
| 2,520,144 | 8/1950 | Holsclaw | 214/373 |
| 2,603,501 | 7/1952 | Graves | 280/414 |
| 2,870,928 | 1/1959 | Haggard et al. | 214/373 |

Primary Examiner—Kenneth H. Betts
Assistant Examiner—R. Schrecengost
Attorney, Agent, or Firm—Rudolph L. Lowell

[57] ABSTRACT

The trailer apparatus is adapted for loading and transporting a farm unit, such as a cattle squeeze chute, that has a rectangular shaped main frame. The trailer includes a U-shape frame with ground wheels outwardly mounted adjacent the rear or free ends of the leg sections. With the leg sections at opposite sides of the chute main frame the trailer is manually backed up and tilted upwardly and rearwardly about the wheel axes thereof to releasably engage the rear ends of the leg sections with corresponding laterally extended support members on the main frame of the farm unit. On then tilting the trailer downwardly and forwardly the main frame of the squeeze chute is releasably connected to forward portions of the leg sections after which the trailer is moved to a substantially horizontal position for connection of its front end with a towing vehicle.

2 Claims, 13 Drawing Figures

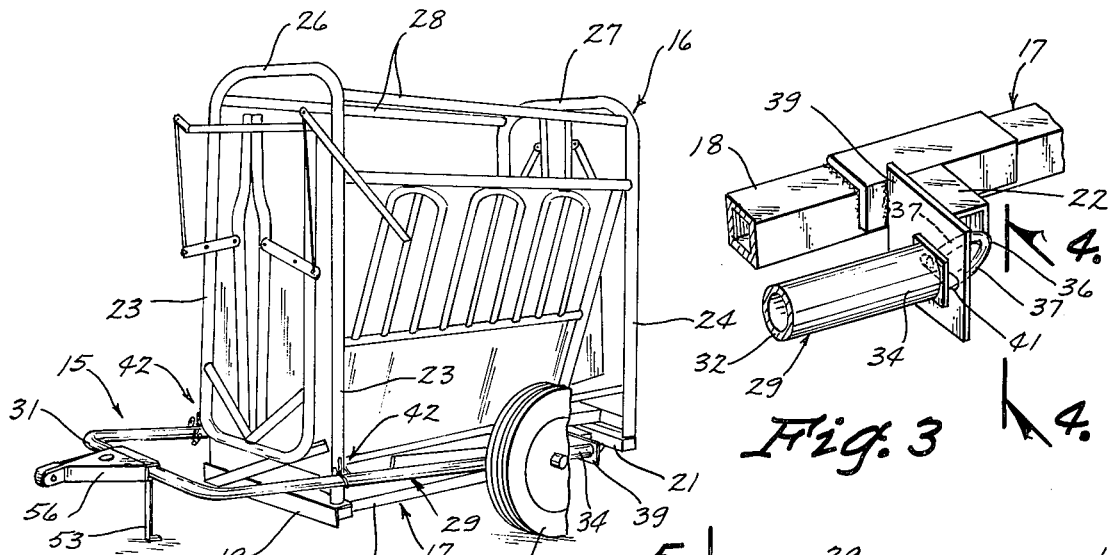
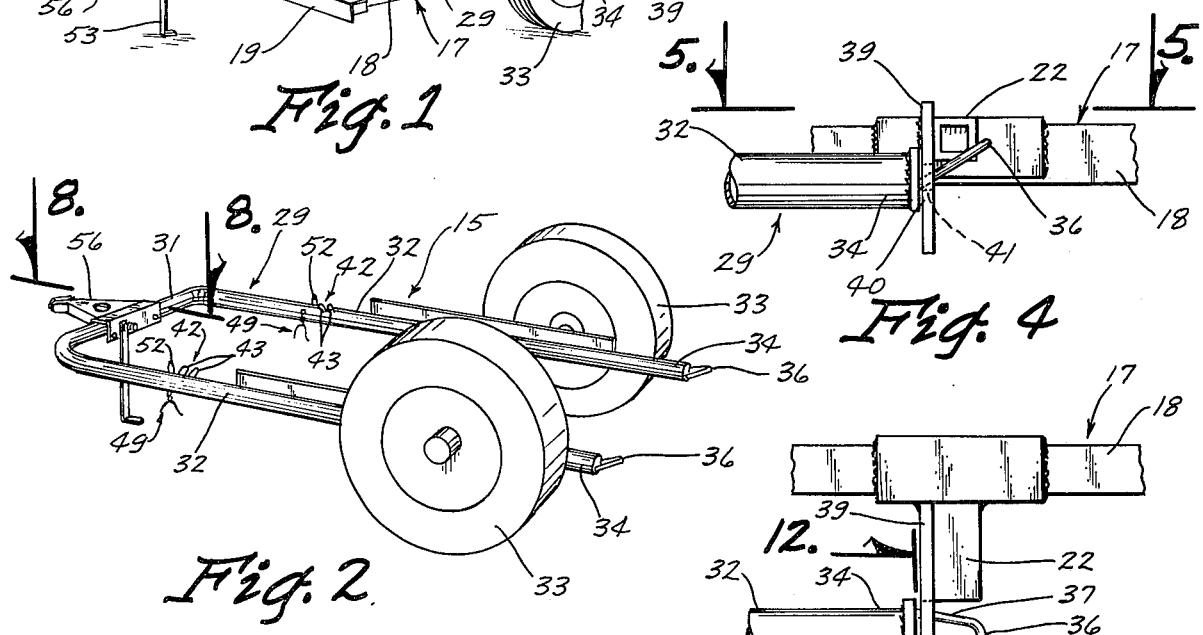
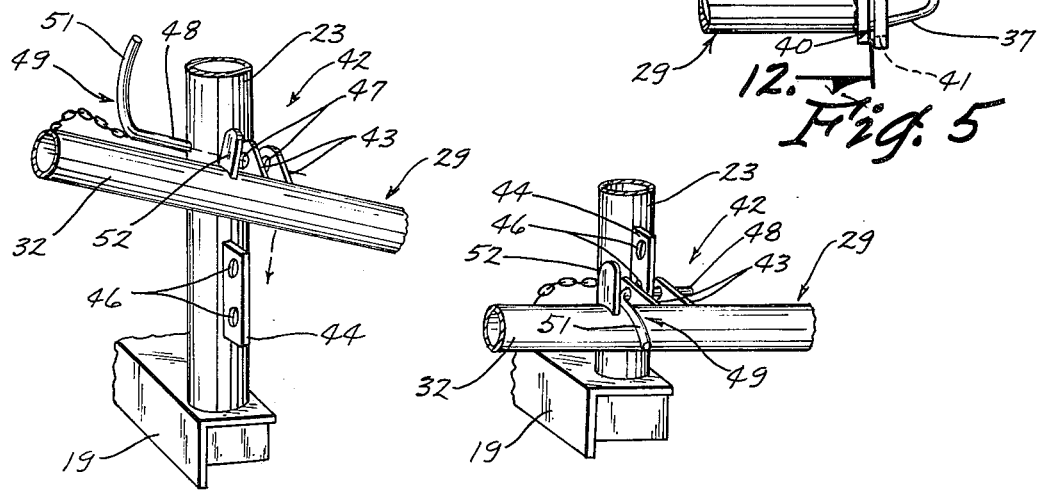

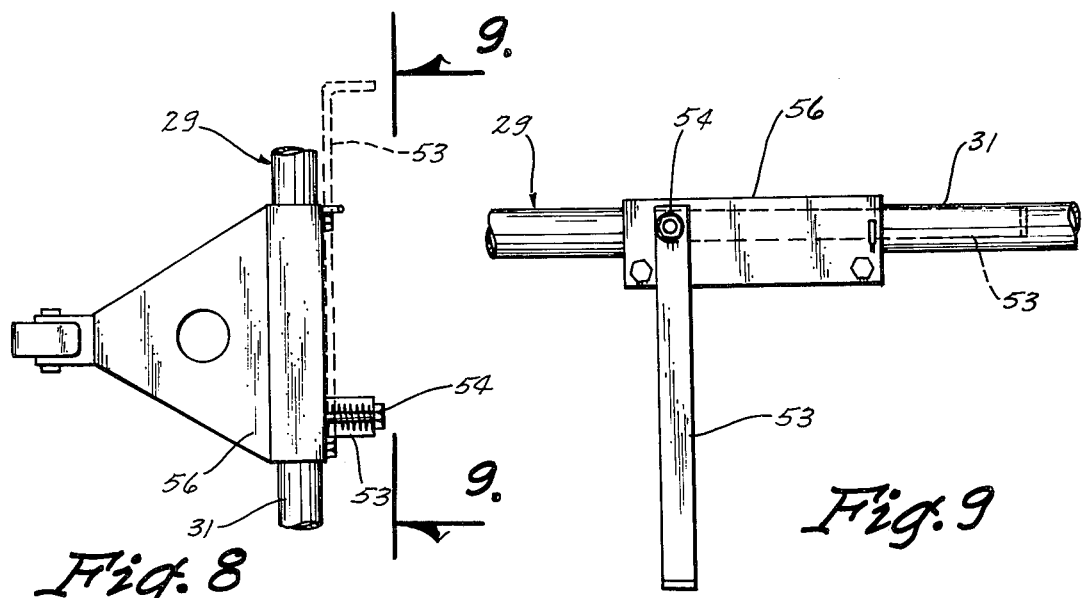
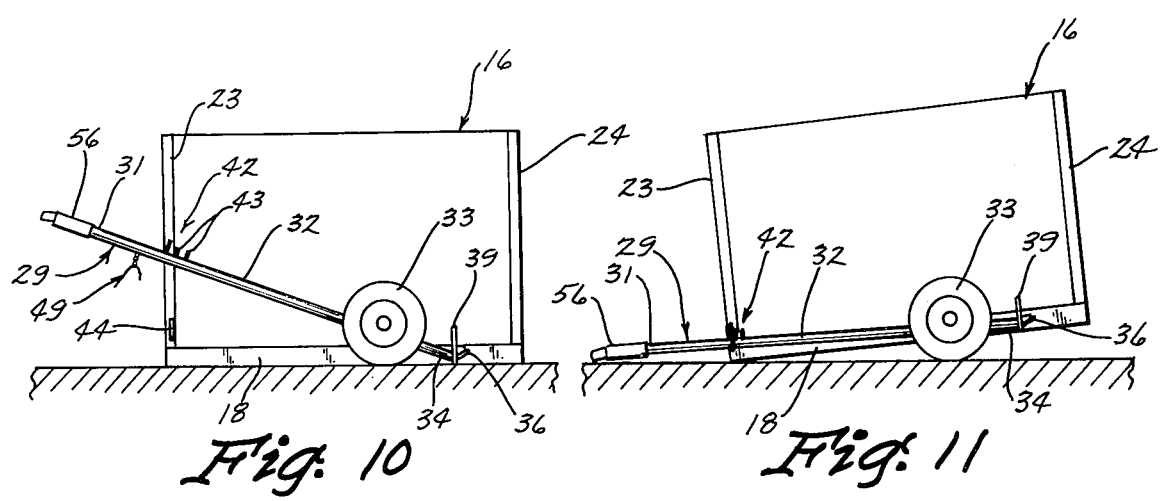
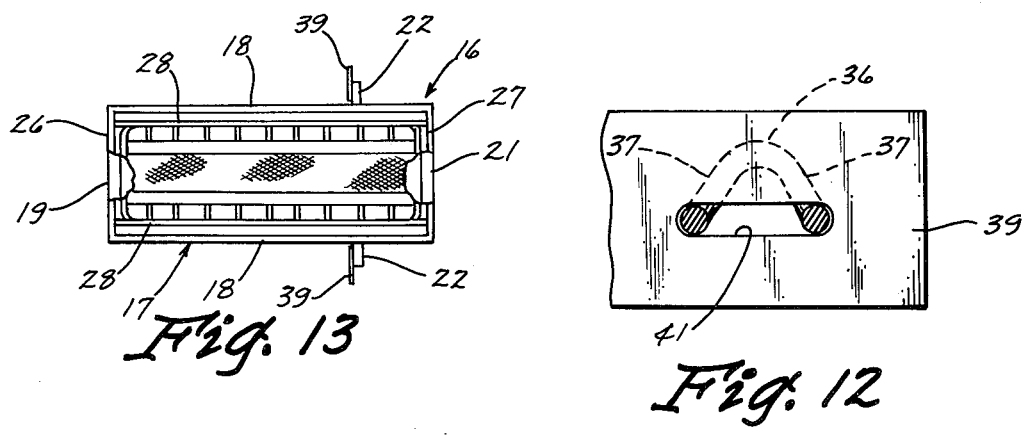

TRAILER APPARATUS FOR LOADING AND TRANSPORTING A FARM UNIT

This is a continuation of application Ser. No. 341,698, filed Mar. 15, 1973 and now abandoned.

SUMMARY OF THE INVENTION

The trailer apparatus is of a simple construction and easily manipulated by one man to load a farm unit thereon, and to connect the trailer apparatus to a towing vehicle. The connection of the rear ends of the trailer leg sections in a full wedged bearing engagement with the lateral support members on the main frame of the farm unit provides for the main frame of the farm unit acting as a transverse brace member for rigidly securing together the rear ends of the leg sections against any twisting or torsional movement that might otherwise occur as a result of the load pressure of the farm unit applied on the ground wheels.

BRIEF DESCRIPTION OF THE DRAWINGS

FIG. 1 is a front perspective view of the trailer apparatus of this invention showing a cattle squeeze chute mounted thereon for transport;

FIG. 2 is a rear perspective view of the trailer apparatus;

FIG. 3 is a detail perspective view showing the releasable connection of a rear portion of the trailer apparatus with the squeeze chute;

FIG. 4 is a side elevational view of the connection shown in FIG. 3 locking in the direction of line 4—4 in FIG. 3;

FIG. 5 is a top plan view of the connection shown in FIG. 3 as seen on the line 5—5 in FIG. 4;

FIG. 6 is a detail perspective view showing a releasable connection for the front portion of the trailer apparatus with the squeeze chute, with the parts to be connected shown in the released positions therefor;

FIG. 7 is a perspective view of the releasable connection in FIG. 6 showing the parts thereof connected together;

FIG. 8 is an enlarged detail plan view of the hitch member for the trailer apparatus as viewed on line 8—8 in FIG. 2;

FIG. 9 is a rear elevational view of the hitch member taken along line 9—9 in FIG. 8;

FIG. 10 is a diagrammatic showing of the trailer and farm unit shown in relatively moved positions for initiating a chute loading operation;

FIG. 11 is illustrated similarly to FIG. 10 and shows the trailer and squeeze chute in positions for completing the chute loading operation;

FIG. 12 is an enlarged sectional view taken on the line 12—12 in FIG. 5; and

FIG. 13 is a top plan view of the squeeze chute shown in FIG. 1.

DETAILED DESCRIPTION OF THE INVENTION

Referring to the drawings, the trailer apparatus 15 of this invention is shown in FIG. 1 with a farm unit 16, illustrated as a cattle squeeze chute, loaded thereon for transport. The squeeze chute includes generally a base or main frame 17 that is ground supported when the squeeze chute is in use. The main frame (FIG. 13) is of a rectangular shape and includes side members 18 connected together by front and rear transverse members 19 and 21, respectively. Arranged at transversely opposite positions on the main frame 17 is a pair of like support members 22, each of which is secured to and projects laterally outwardly from a corresponding side member 18. Projected upwardly from the main frame 17 are front and rear corner posts 23 and 24, respectively, (FIG. 1) which form part of upright front and rear end frames 26 and 27, also respectively, which are connected together by longitudinal brace members 28. For a more detailed description of the squeeze chute 16, reference is made to U.S. Pat. No. 3,683,864.

The trailer apparatus 15 (FIG. 2) includes a main frame 29 of a U-shape formed from a single length of a round tubular material. The base section 31 of the trailer frame 29 is located forwardly with the leg sections 32 rearwardly extended therefrom in a parallel spaced relation. A pair of ground supported wheels 33 are rotatably mounted on corresponding leg sections 32 at positions to the outside of the trailer frame 29 and adjacent to the rear ends 34 of the leg sections.

The rear end 34 of each leg section terminates in an upwardly and rearwardly inclined tongue member 36 (FIGS. 3, 4 and 5) of a generally V-shape with the sides 37 thereof inclined inwardly and rearwardly toward each other. Also, and as best appears in FIG. 2, the tongue members 36 lie in a common plane extended transversely of the trailer frame 29. Each tongue member 36 is releasably connectable with a support member 22 to carry the rear end of the squeeze chute 16 in a supported or loaded position at the rear ends 34 of the leg sections 32. For this purpose (FIGS. 3, 4 and 5) each support member 22 is provided with a terminal flat upright plate extension 39 arranged in a plane extended transversely of the squeeze chute 16. Adjacent its free end each extension 39 is formed with a transversely extended elongated hole 41 (FIGS. 3 and 12) of a size and shape corresponding to the cross sectional area of a tongue 36 at a position, indicated at 40 in FIGS. 4 and 5, adjacent the rear end 34 of a leg section 32 for a purpose to appear later.

Corresponding to leg section 32 is forward connection 42 (FIG. 7) for supporting the front end of the squeeze chute 16 in a loaded position on the trailer 15. A forward connection 42 is located between the front base section 31 and the wheels 33 at a position closer to the base section than to such wheels to provide for the use of the leg sections as a lever means for tilting the trailer frame relative to the axes of the wheels 33. Each forward connection 42 comprises a pair of flat fingers 43 secured to and projected radially inwardly of a corresponding leg section 32 in a spaced relation longitudinally of such section. Coacting with each pair of fingers 43 for supporting the forward end of the squeeze chute 16 on the trailer frame 29 is a flat upright connecting plate 44 (FIGS. 6 and 7) corresponding to and projected laterally outwardly from each front post 23. In this respect it is to be noted that the fingers 43 are spaced longitudinally of a leg section 32 so that when the tongues 36 at the rear ends of the leg sections 32 are inserted within corresponding elongated holes 41 an upright plate 44 is positionable between an associated pair of fingers 43.

Each plate 44 (FIGS. 6 and 7) is formed with a pair of vertically spaced holes 46 and each pair of fingers 43 is formed with aligned holes 47. With a plate member 44 located between a pair of fingers 43, the finger holes 47 are moved into alignment with one of the holes 46 for receiving therethrough one leg 48 of a right angle locking pin 49. The other leg 51 of the locking pin 49 is then movable to a position extended across the top of an associated leg section 32 into contact engagement with the rear side of a stop member or abutment 52 that is secured to and projects upwardly from a leg section 32. By virtue of the engagement of the locking pin leg 51 with the abutment 52 the pin leg 48 is held against movement out of the aligned holes 47 and a hole 44. The selection of a hole 44 in an upright plate 44 is dependent on the height at which the trailer frame 29 is to be connected with a towing vehicle.

In the use of the trailer apparatus 15, and as shown in FIG. 10, assume the squeeze chute 16 to be in a ground supported position. The trailer is then backed up relative to the chute 16 to locate the leg sections 32 at opposite sides of the chute frame 17. The trailer frame 29 is then tilted downwardly and rearwardly about the axes of the wheels 33 and manipulated to insert the tongues 36 within corresponding elongated holes 41. With the tongues 36 in their inserted positions, the trailer frame 29 is tilted downwardly and forwardly to its position shown in FIG. 11 wherein an upright connecting plate 44 is located between a pair of corresponding fingers 43. The fingers 43 and plate 44 are then releasably connected together by the locking pin 49 in the manner previously described.

With the rear end of the squeeze chute secured to the leg sections at the tongues 36 and the forward end of the squeeze chute secured to the trailer frame at the fingers 44, the chute is loaded for transport and the trailer need only be hitched to a towing vehicle. This hitching is accomplished by merely moving the trailer frame 29 to its substantially horizontal position shown in FIG. 1 or to a level in line with the hitch on the towing vehicle. This hitching position may be maintained by the provision of a leg unit 53 that is pivotally supported at 54 on the rear side of a trailer hitch member 56 (FIGS. 8 and 9) that is rigidly secured to the front base section 31 of the trailer frame 29. The supporting leg 53 is pivotally movable from a position extended longitudinally of the base section 31, as shown in dotted lines in FIG. 8, to an upright supporting position, shown in FIGS. 1 and 9. The hitch member 56 projects forwardly from the front base section 31 for connection with the towing vehicle.

By virtue of the relative construction of each tongue 36 and corresponding elongated hole 41, it is seen that the weight of the squeeze chute 16 urges a lateral support member 22 downwardly of a tongue member 36 for wedged bearing engagement therewith at the sidewall of the hole 41. By virtue of this full bearing engagement the frame 17 of the squeeze chute functions as a transverse connecting member between the leg sections 32 so as to substantially eliminate any torsional twisiting of the leg sections that might otherwise result from the load pressure applied on the wheels 33 by the weight of the squeeze chute 16.

To unload the squeeze chute at a desired location, and after the trailer has been disconnected from a towing vehicle, the support leg 53 is moved to its dotted line position in FIG. 8 and the trailer frame 29 tilted to a downwardly and forwardly inclined position to provide for the disconnection of the connector plates 44 from the spaced fingers 43. With the front end of the chute released and resting on the ground, the trailer frame is then inclined downwardly and rearwardly to its position, shown in FIG. 10, to provide for a full ground support of the squeeze chute. With the squeeze chute resting on the ground the trailer frame is merely pulled in a forward direction away from the chute which is then immediately available for use.

Although the invention has been described with resepct to a preferred embodiment thereof, it is to be understood that it is not to be so limited since changes can be made therein which are within the full intended scope of this invention as defined by the appended claims.

I claim:

1. A trailer apparatus for lifting and transporting an article of substantially rectangular parallelepiped form having a pair of outwardly directed vertically oriented apertured support plates oppositely positioned at the bottom edges of such article near one end thereof, the aperture in each such support plate constituting a substantially rectangular opening therethrough which is elongate in the horizontal direction, comprising a substantially U-shaped trailer frame member adapted to straddle such article to be transported, a ground wheel mounted on the outer side of each leg of said U-shaped frame member near the free end thereof for supporting said frame member above the ground, said free ends constituting the rear portions of said frame member, a tongue member mounted on each free end of said U-shaped frame member and extending upwardly and rearwardly therefrom, each said tongue member having a cross-sectional perimeter at its forward end substantially equal to the perimeter of a corresponding one of such apertures in such support plates on the article to be transported, said tongue members being tapered rearwardly to a progressively smaller cross-sectional perimeter, each said tongue member thus substantially filling such corresponding aperture when fully inserted therein to preclude substantially all movement relative thereto except for limited pivotal movement in the vertical plane through the corresponding leg of said frame member, and means on each leg of said frame member forward of said wheels for connecting said frame member to such article to be transported at a location on the latter remote from such support plates thereon, whereby the full insertion of said tongue members into corresponding ones of such support plate apertures in wedging relationship therewith prevents torsional movement of said frame member which would otherwise occur as the weight of such article to be transported is borne by said frame member.

2. A trailer apparatus for loading and transporting a farm unit having a rectangular shaped horizontal main frame with a pair of forwardly positioned transversely opposite upright members, and a pair of rearwardly positioned transversely opposite laterally outwardly projected support members, said trailer apparatus including:

a. a generally U-shaped frame having a front base section and rearwardly extended leg sections transversely spaced a distance apart slightly greater than the transverse dimension of said main frame.

b. a pair of ground wheels corresponding to said leg sections, each ground wheel rotatably mounted on an associated leg section adjacent the rear end thereof and at a position outwardly from said U-shape frame, c. first coacting means on the rear end of each leg section and to each of said support members for releasably connecting together said rear ends and said support members when said U-frame is tilted about the axis of said ground wheels to a rearwardly and downwardly inclined position, d. coacting means on each upright member and adjacent leg section for releasably connecting together said upright members with forward portions of said leg sections when said U-frame, with the support members connected to the rear ends of said leg sections, is tilted about the axes of said wheels to a forwardly and downwardly inclined position in substantially the plane of said main frame, e. said first coacting means including an upwardly and rearwardly inclined tongue member extended rearwardly from the rear end of each leg section with the sides thereof tapered inwardly toward each other from the forward end thereof, and f. each laterally projected supported member having an elongated opening extended transversely of said main frame, said elongated openings spaced transversely of said main frame a distance apart equal substantially to the distance between the longitudinal axes of said leg sections, and each of said elongated openings being of a size and shape corresponding substantially to the transverse cross-sectional area of a corresponding tongue member at a position adjacent the forward end thereof to provide for the insertion of each tongue member within a corresponding elongated opening to a wedged position wherein the cross-sectional perimeter of each such tongue member at the forward end thereof substantially fills the corresponding elongated opening, whereby substantially all relative movement therebetween is precluded except for limited pivotal movement in the vertical plane through each said extended leg section.

* * * * *